United States Patent [19]
Henry

[11] Patent Number: 5,192,343
[45] Date of Patent: Mar. 9, 1993

[54] HIGH EFFICIENCY PARTICULATE AIR FILTER VENTILATION SYSTEM

[76] Inventor: Harold G. Henry, 41 Ponderosa La., Palmyra, Va. 22963

[21] Appl. No.: 786,762

[22] Filed: Nov. 1, 1991

[51] Int. Cl.5 ............................................. B01D 46/04
[52] U.S. Cl. ........................................ 55/213; 55/320; 55/500; 55/21
[58] Field of Search ....................... 55/21, 92, 213, 318, 55/320, 472, 500

[56] References Cited

U.S. PATENT DOCUMENTS

| | | | |
|---|---|---|---|
| 4,312,645 | 1/1982 | Mavros et al. | 55/213 |
| 4,450,964 | 5/1984 | Wood | 206/527 |
| 4,521,234 | 6/1985 | Peebles, Jr. et al. | 55/481 |
| 4,784,675 | 11/1988 | Leber et al. | 55/213 |
| 4,786,295 | 11/1988 | Newman et al. | 55/213 |
| 4,838,910 | 6/1989 | Stollenwerk et al. | 55/472 X |
| 4,929,261 | 5/1990 | Jacobson | 55/213 |
| 4,979,967 | 12/1990 | Walter et al. | 55/84 |
| 5,042,997 | 8/1991 | Rhodes | 55/213 X |

*Primary Examiner*—Charles Hart
*Attorney, Agent, or Firm*—CD & C

[57] ABSTRACT

A high efficiency ventilation system for removing contaminants from an area. The system includes a fan unit and filter unit. The filter unit has two filters, a prefilter and a HEPA filter, each of which has its static pressure monitored by a separate gauge. The static pressure of the fan used in the fan unit is monitored by a third gauge. Thus, it is possible to determine which of two filters needs replacement and troubleshooting can be performed much faster and more efficiently.

10 Claims, 3 Drawing Sheets

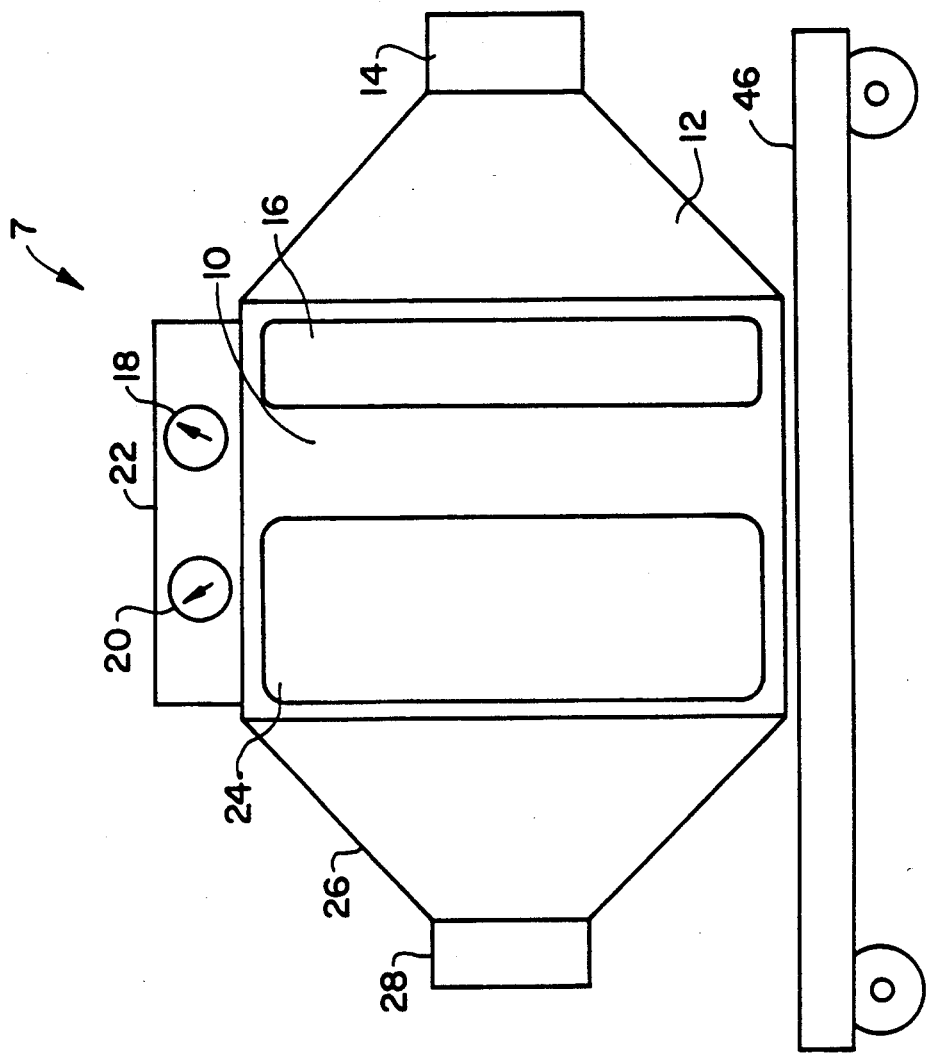
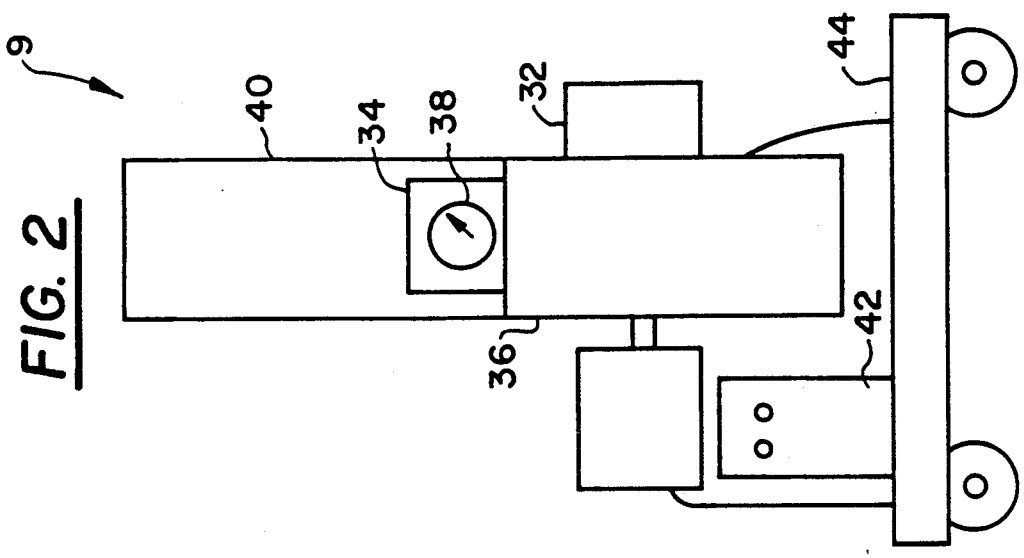

HIGH EFFICIENCY PARTICULATE AIR FILTER VENTILATION SYSTEM

BACKGROUND OF THE INVENTION

1. Field of the Invention

This invention relates to an apparatus and for filtering air in a predetermined area. More specifically, the present invention is directed to a method and device used for filtering contaminant from a contaminated area in an efficient and safe manner.

2. Description of the Related Art

It is often desirable to filter the air in a closed room due to the presence of contaminants. These contaminants could have been caused by equipments leaks, chemical spills or any other situation where contaminants have entered the air. An example of such a setting is a nuclear power facility, where it is desirable to reduce or eliminate the spread of radioactive particles so that the amount of radioactive particles that workers are exposed to is well below preestablished limits.

A typical ventilation unit has a filter unit and a fan. A gauge is mounted across the filter unit for measuring the differential pressure. The filter unit contains two filters, a prefilter and a HEPA (high efficiency particulate air) filter. Most known units can also be supplied with a carbon filter. All ventilation units, regardless of capacity, are operated in the same manner. Flexible ducting is coupled to the intake of the filter housing and directed to the area that requires ventilation. The exhaust fan is then started and the unit is run until the room has been completely ventilated or the pressure gauge indicates a high reading, suggesting that the filter(s) need changing.

The known prior art units have several problems. No visual method is known for determining the amount of air flowing through the system. To determine the system air flow requires that velocity measurements be taken, which involves placing a measuring instrument into a potentially contaminated piece of duct work and contaminating the instrument.

As the ventilation system operates, the filters in the filter unit begin to filter out the contaminant in the air. More contaminants are filtered out as the system continues to run. The contaminant filtered out of the air and trapped on the filters cause the static pressure across the filters to increase, which increases the static pressure facing the exhaust fan. The total flow through the ventilation system is thus decreased. The higher the static pressure existing across the filters, the smaller the air flow. Therefore, it is necessary to perform continuous measurements of the velocity to determine the air flow.

Because there is only a single pressure gauge across the filter housing that normally houses two filters, the prefilter and HEPA filter, the gauge indicates the total increase in static pressure across both filters as the filters collect contaminants. HEPA filters are able to withstand large static pressures, between 12 and 16 inches water gauge, before rupturing. However, the prefilter should be changed when the pressure across it reaches 0.5 inches water gauge according to the filter specifications set forth by manufacturers. As the single pressure gauge fails to differentiate between filters and does not indicate which filter is receiving the heaviest loading, the prefilter could easily rupture, which in turn damages the HEPA filter. Rather than allowing the prefilter to rupture, it is widely accepted practice to replace both filters each time the gauge has a high reading. This is wasteful of time and money and exposes employees to contaminants more often than is necessary.

Further, the differential pressure gauge across the filter unit does not present an accurate reading of the true differential pressure loading of the filters. Indeed, as the filters traps contaminants, the static pressure across the filters rises as well. Because of the increased static pressure across the filters, the static pressure facing the exhaust fan also increases, thus reducing the total system flow resulting in a reduced air volume flowing across the filters. As the filters have less air flowing across the gauge than they did originally, the static pressure reading is not a true reading.

These ventilation systems often are designed to be portable and, as noted above, have flexible ducting connected thereto that are directed to the area to be ventilated. This flexible ducting crushes or deforms easily, and if such should happen, the system flow will be considerably reduced.

Yet a further deficiency known with respect to prior models of ventilation units is that some models claim that the units includes a bag-in, bag-out filter housing that allows personnel to change filters inside a filter change bag, eliminating the need for respirators or the potential to spread contamination. In actuality, it is necessary to worry about contamination and have employees wear respirators, as the internal parts of the ventilation units are exposed.

U.S. Pat. Nos. 4,450,964 to Wood and 4,521,234 to Peebles, Jr. et al. are both directed at housings for filter units, and not an entire ventilation system. These housings are well known and commonly designed to be used as housings in ventilation systems.

U.S. Pat. No. 4,786,295 to Newman et al. teaches a filtration device for airborne contaminants. This device has many of the above-described problems. The main problem with this device is the lack of a gauge across each filter. Thus, it will be impossible to determine which filter needs to be replaced, and the possibility of rupture of the prefilter is always present.

SUMMARY OF THE INVENTION

The present invention is directed towards a system for removing contaminants from an area. The invention utilizes a first gauge disposed so as to measure the static pressure across the prefilter, a second gauge to measure the static pressure across the HEPA filter, and a third gauge to measure the static pressure across the fan. Such a construction allows an operator to determine the static pressure across each filter as well as the volume of air being discharged. Thus, since the static pressure across each filter is known at a corresponding volume of air, it is possible to prevent ruptures of filters by changing only the filter that has too large a static pressure thereacross.

The present invention further allows for other problems with the apparatus and the airflow therethrough to be detected early due to the presence of the three individual gauges.

The apparatus according to the present invention includes a fan for moving air through the apparatus. A first monitoring means monitors the first static pressure across the fan. The action of the fan sucks air into a filter housing. Disposed in the housing is a first filter means for prefiltering the air moving through the apparatus. A second monitoring means monitors a second static pressure across the first filter means, and the second monitoring means is disposed on the housing. Also disposed in the housing is a second filter means for filtering the air after the air is filtered by the first filter means. A third monitoring means monitors a third static pressure across the second filter means. The third monitoring means is disposed on the housing proximate the second filter means. The apparatus further includes means for exhausting the air after it has been filtered.

The present invention is also directed at a method for removing a constant volume of air from a contaminated area and filtering the air. The method includes removing air from the area and forcing the air through a prefilter and a HEPA filter via the fan, monitoring the static pressure across each of the fan, prefilter and HEPA filter using first, second and third gauges, respectively, and exhausting the removed air after the air has passed through the fan.

Also, the present invention allows filters to be changed without the use of a respirator by employees. The nature of the filter housing allows for such a efficiency in changing the filter.

BRIEF DESCRIPTION OF THE DRAWINGS

Other objects, features and characteristics of the present invention, as well as methods of operation and function of the related elements of the structure, will become apparent upon consideration of following description and the appended claims with reference to the accompanying drawings, all of which form a part of this specification and where:

FIG. 2 is a side view of a fan unit used in the ventilation system according to the present invention;

FIG. 3 is a side view of the filter unit used in the ventilation system according to the present invention;

DETAILED DESCRIPTION OF THE PRESENTLY PREFERRED EXEMPLARY EMBODIMENT

Figure 1:
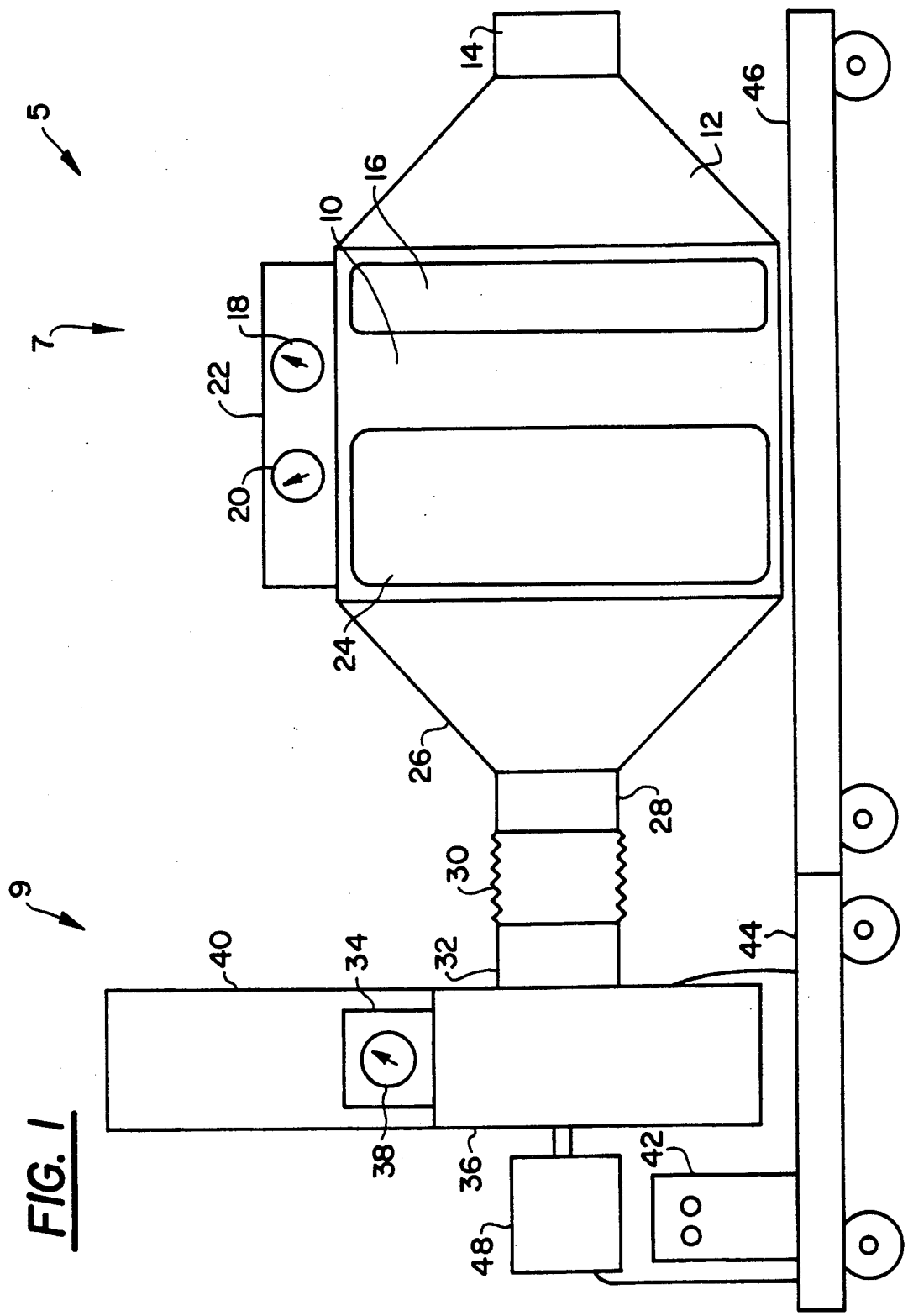
FIG. 1 is a side view of a ventilation system according to the present invention.
Figure 4A:
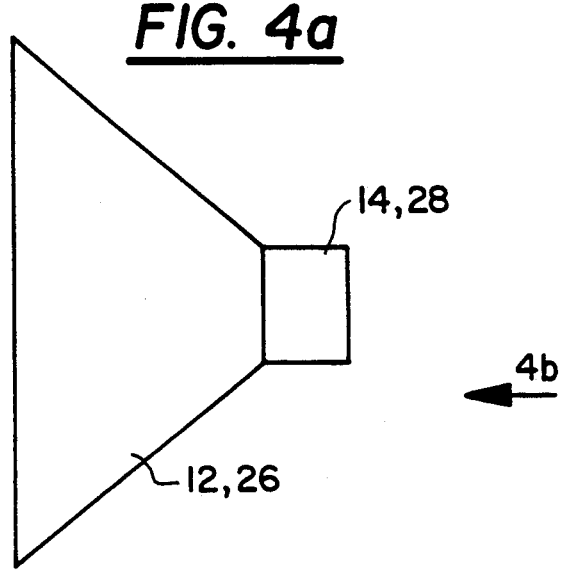
FIG. 4a is a side view of the inlet/outlet transition piece used in the ventilation system according to the present invention.
Figure 4B:
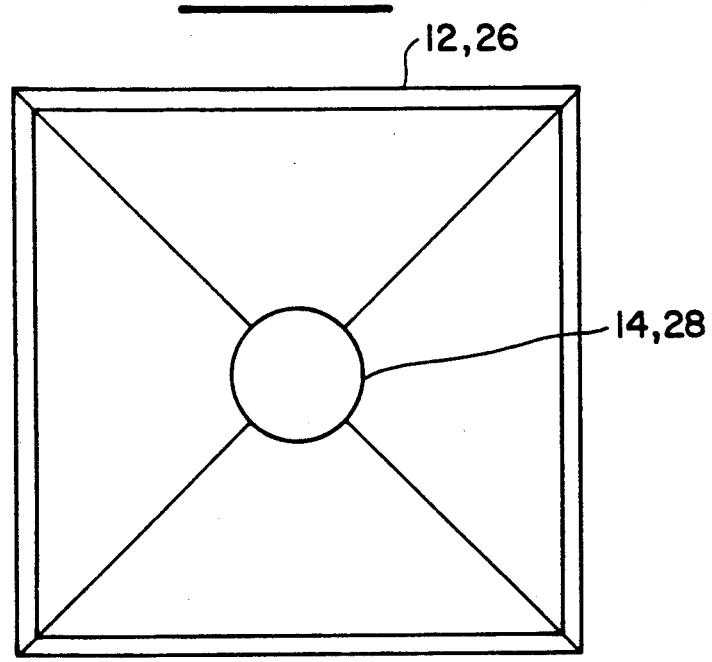
FIG. 4b is a front view of the piece shown in FIG. 4a in the direction of arrow 4b.

The ventilation system according to the present invention is shown generally at 5 in FIG. 1. Ventilation system 5 will be described with reference to FIGS. 1-4b.

Ventilation system 5 includes two main pieces, fan unit 9 and filter unit 7. Each of filter unit 7 and fan unit 9 sets on its own cart, 46 and 44, respectively. These carts 44, 46 are preferably metal carts to support the weight of the units 7 and 9.

Filter unit 7 includes two filters housed behind doors 16 and 24 located on housing 10. Housing 10 is preferably made of sturdy metal. A prefilter, which is commercially available, is disposed behind door 16 and a HEPA filter, also commercially available, is disposed behind door 24. The HEPA filter is rated at about 12 to 16 inches water gauge, while the prefilter is rated at about 1.3 inches water gauge.

Housing 10 has a gauge holding frame 22 disposed thereon. Gauge holding frame 22 contains two gauges identified by reference numerals 18 and 20. Gauge 18 measures the static pressure across the prefilter housed behind door 16. Gauge 20 measures the static pressure across the HEPA filter housed behind door 24. Installation of the two individual gauges 18 and 20 allows an operator to individually monitor the static pressure across the prefilter and HEPA filter respectively. The readings taken from gauges 18 and 20 are true indications of the static pressure across each of the filters. Gauges 18 and 20 are, for example, magnehelic or photohelic gauges.

Filter unit 7 further includes inlet and outlet channels 12 and 26 respectively. Inlet channel 12 increases in size between inlet connector 14 and filter housing 10. Inlet connector 14 is sized so that a flexible ducting (not shown) may be connected thereto. The flexible duct is positioned in the area to be ventilated, and the air from this room is drawn through the duct, into inlet channel 12, through filter housing 10 and the pre- and HEPA filters, and is then expelled through outlet channel 26.

Outlet channel 26 is constructed of a metal piece the same size as inlet channel 12. Outlet channel 26 funnels the air flowing through housing 10 to a smaller flow diameter in outlet connector 28. Outlet connector 28 is a metal piece the same size as inlet connector 14. The air that flows through housing 10 and the filters contained therein exits filter unit 7 via outlet channel 26 and outlet connector 28.

Outlet connector 28 is connected to a piece of flexible ducting 30. Flexible ducting 30 connects filter unit 7 to fan unit 9. It is possible that duct 30 could have considerable length, thereby allowing fan unit 9 and filter unit 7 to be spaced apart by a significant amount. That is, carts 44 and 46 could be moved so as not to abut each other.

The free end of duct 30 is connected to fan transition element 32. Fan transition element 32 is the same size as outlet connector 28.

Fan unit 9 includes exhaust fan 36 that operates at a high static pressure to produce the required airflow through the ventilation system 5. An example of such a fan is one that has an airflow of 1000 cfm (cubic feet per minute) at 12 inches water gauge. Of course, if it is desired, it is possible to have the airflow be higher or lower. Such changes would result in minor modifications to the invention. The fan is driven by motor/starter 48/42. Fan unit 9 has exhaust duct 40 with a damper at the end of the duct. The exhaust damper in exhaust duct 40 controls the volume of air flowing through the ventilation system 5. Differential pressure gauge 38 mounted in gauge holding frame 34 measures the static pressure across the fan. Gauge 38, like gauges 18 and 20, is, for example, a magnehelic or photohelic gauge.

By adjusting the exhaust damper in exhaust duct 40, it is possible to regulate the volume of air flowing through ventilation system 5. By adjusting the damper, the airflow can be likewise adjusted until gauge 38 reads the desired reading. This desired reading corresponds to the design reading of the system for airflow and indicates that ventilation system 5 is running as initially determined.

Should the length of flex duct 30 or the flex duct attached to inlet connector 14 be increased, the overall static pressure of ventilation system 5 will be increased. To bring the airflow back to the design flow, the damper in exhaust duct 40 can be adjusted towards an open position. An important aspect to operating the ventilation system is to maintain a constant volume discharge.

The addition of gauges 18, 20 and 38 as well as the exhaust damper in exhaust duct 40, an operator can visually troubleshoot and locate problems in ventilation system 5. These problems include the following possible scenarios but are not limited thereto.

As described above, as gauges 18 and 20 enable the static pressure to be measured across the pre- and HEPA filters, respectively, only the filter that has built up an unacceptable static pressure needs to be changed, rather than both or the wrong filter.

If exhaust fan 36 has motor 48 that is a three phase motor and a single electrical lead is connected out of phase, exhaust fan 36 will operate and air would continue to exhaust from the damper in exhaust duct 40. However, fan 36 will be running backwards and the air exhausted from the unit will be reduced as is the fan static pressure. The present invention provides gauges that inform the operator of a reduced airflow, and the operator can then determine that the fan is running backwards because the exhaust damper in exhaust duct 40 can not be adjusted in order to obtain the required fan static pressure.

Also, many fans in common use are belt driven. If the belts driving a fan begin to slip, the airflow through a system will begin to drop, a fact that the gauges will indicate. An operator can determine that the belts driving the fan are slipping because adjustment of the damper will not correct the deviation in the static pressure of fan 36.

If the flex duct hose connected to inlet connector 14 is blocked or crushed, the present invention allows an operator to discover that problem by looking at gauges 18, 20 and 38. In this case, fan gauge 38 goes to maximum, while prefilter gauge 18 and HEPA filter gauge 20 go to zero. Thus, an operator will know to shut down the system and look for areas where the hose is blocked or crushed. The same occurs when flex duct 30 becomes blocked or crushed, but it is more likely for blockages to occur in a hose joined to inlet connector 14.

The presence of gauges 18, 20 and 38 allows the present invention to both monitor static pressure across individual filter units and to troubleshoot problems that might arise in the present invention. The addition of a gauge for each filter unit allows difficulties with filters to be pinpointed to the specific filter, and the operator will thereby be saved both time and money in replacing only the filter that is in need of replacement.

The present invention has been described in connection with what is presently considered to be the most practical and preferred embodiment. Of course, it is to be understood that the present invention is not limited to the disclosed embodiment, but is intended to cover various modifications and equivalent arrangements included within the spirit and scope of the appended claims.

What is claimed is:

1. An apparatus for ventilating an area, said apparatus comprising:
    a housing having an inlet and an outlet;
    a fan for moving air through the housing;
    first monitoring means for monitoring a first static pressure across said fan;
    first filter means mounted in said housing for prefiltering the air moving through the housing;
    second monitoring means for monitoring a second static pressure across said first filter means;
    second filter means mounted in said housing for filtering the air filtered by said first filter means;
    third monitoring means for monitoring a third static pressure across said second filter means; and
    means for varying a volume of air flowing through said housing and said fan;
    wherein said varying means comprises a damper mounted in an outlet passage from said fan.

2. An apparatus as claimed in claim 1, wherein said first, second and third monitoring means are one of magnehelic gauges and photohelic gauges.

3. An apparatus as claimed in claim 1, wherein said second filter means is a HEPA filter.

4. An apparatus as claimed in claim 1, wherein said fan is remote from said housing and operatively connected to said outlet.

5. An apparatus as claimed in claim 1, wherein said fan is disposed on a first cart and said housing is disposed on a second cart.

6. An apparatus as claimed in claim 5, wherein said fan and said housing are connected via a segment of flexible ducting.

7. An apparatus as claimed in claim 1, wherein said housing includes:
    an inlet channel of increasing cross section for expanding airflow from said inlet to said first filter means; and
    an outlet channel of decreasing cross section for reducing airflow from said second filter means.

8. An apparatus as claimed in claim 7, further comprising an inlet connector for coupling said housing to a first end of a flexible duct, said duct having a second end disposed in said area to be ventilated.

9. An apparatus as claimed in claim 7, further comprising an outlet connector for coupling said housing to said fan via a segment of flexible ducting.

10. An apparatus for filtering the air from a contaminated area, said apparatus comprising:
    a housing containing a prefilter and a HEPA filter, said housing having an inlet and outlet and fully enclosing said prefilter and said HEPA filter;
    first and second means for monitoring static pressures across the prefilter and HEPA filter respectively;
    a fan connected to said housing for sucking air from the contaminated area through said housing from said inlet to said outlet, the air passing through the prefilter and then the HEPA filter;
    a third means for monitoring static pressure across the fan;
    an exhaust duct for discharging the air after the air has passed through the prefilter and HEPA filter; and
    a damper mounted to said exhaust duct for controlling a volume of air flowing through said housing and said fan.

* * * * *